United States Patent Office 3,412,554
Patented Nov. 26, 1968

3,412,554
DEVICE FOR BUILDING UP HIGH PULSE
LIQUID PRESSURES
Bogdan Vjacheslavovich Voitsekhovsky, Elmar Andreevich Antonov, Valentin Pavlovich Nickolaev, Grigory Jankelevich Shoikhet, Vladimir Mikhailovich Dudin, Alexandr Vasiljevich Shevchenko, and Nickolai Fedorovich Olenkov, Novosibirsk, U.S.S.R., assignors to Institute Gidrodinamiki Sibirskogo Otdelenia Akademii Nauk U.S.S.R., Novosibirsk, U.S.S.R.
Filed May 5, 1965, Ser. No. 453,424
15 Claims. (Cl. 60—54.5)

The present invention relates to devices for building up static and dynamic liquid pressures of relatively high magnitudes and of pulse form.

Pressure magnitude is generally limited only by the strength of the material of the vessel in which this pressure is built up.

Known devices for building up liquid pressures include those based on the use of an electric discharge or of a detonation of an explosive directly in the liquid. The practical use of such known devices is limited by the low efficiency of the utilization of the liberated energy.

Devices, which use an electric discharge in liquid to obtain pulse pressures, require high-voltage equipment. This equipment is rather complicated in operation especially under industrial conditions. Besides, high-voltage equipment is very expensive and does not have a high degree of reliability.

Devices, which use the energy of explosions in liquid for building up pulse pressures, also have a number of disadvantages. These disadvantages include the danger of employing explosives under industrial conditions, mechanical difficulties and automatization difficulties, as well as the high cost per unit of energy liberated by an explosive.

An object of the present invention is to eliminate the disadvantages of these known devices.

A particular object of the invention is to provide an improved industrial installation for building up liquid pressure pulses, said installation having a higher efficiency than known devices.

These objects are achieved, in accordance with the invention, by using a device for building up liquid pressure pulses, with at least one cylinder, said cylinder housing a piston. At one side of the piston, the cylinder space is filled with compressed gas and serves as a low-pressure chamber designed to accumulate energy from the forced stroke of the piston in the direction of the chamber. The space at the other side of the piston is filled with liquid and serves as a high-pressure chamber. High pressure in the chamber is built up as a result of an impact of the piston upon the liquid in this chamber, said piston obtaining mechanical energy in the process of its acceleration during expansion of compressed gas.

The device is fitted with one or more receivers for compressed gas, said receivers communicating with the low-pressure chamber through openings in the cylinder side wall, said openings being located close to the face wall of the low-pressure chamber.

Other objects and features of the invention are next described with reference to an exemplary embodiment as illustrated in the appended drawings wherein.

Figure 1:
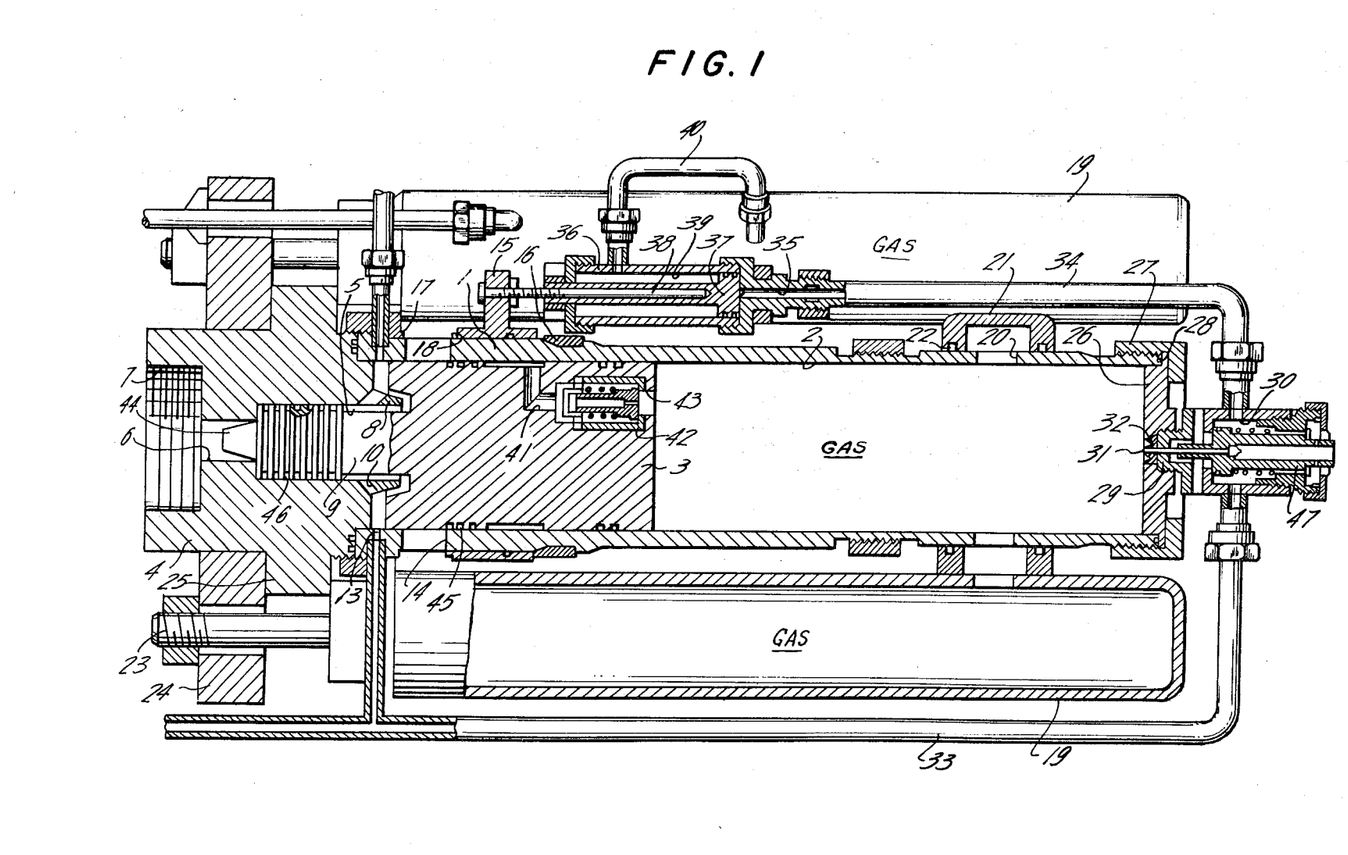
FIG. 1 is a sectional view of a device, provided in accordance with the invention wherein the forced travel of the piston for compressing gas is effected by liquid pressure, the device including a high-pressure chamber housed in a cylinder body.

The device shown in FIG. 1 consists of cylinder 1, whose bore serves as a low-pressure chamber 2. The low-pressure chamber houses a solid reciprocating piston 3 which defines a space 2a. Cylinder 4, housing high-pressure chamber 5, is rigidly fixed by a thread to the front part of cylinder 1 and is coaxial with the latter. Cylinder 4 has prestressed walls. High-pressure chamber 5 ends with outlet opening 6. The high-pressure chamber may have several outlet openings depending on the requirements of the proposed device. The section of opening 6 may correspond to the internal cross section of chamber 5 of cylinder 4. High pressure chamber 5 of cylinder 4 is periodically filled with a liquid.

The front part of cylinder 4 is provided either with internal or external thread 7 by which loads such as, for instance, a hydropress cylinder, are connected to high-pressure chamber 5. In the rear part of cylinder 5, its chamber 5 has taper-shaped widening 8 which serves as a guid for rod 9 of piston 3. It should be noted that high-pressure chamber 5 may have a cross section corresponding to the cross section of piston 3, so that the rod need not be employed.

The length of taper-shaped widening 8 is limited by channels 10 disposed in the side wall of cylinder 4, channels 10 communicating with low-pressure chamber 2 and high-pressure chamber 5. These channels are intended for the free escape of liquid when rod 9 of piston 3 passes said widening 8. The total cross-section of channels 10 is chosen at the maximum allowed by the design.

Figure 4:
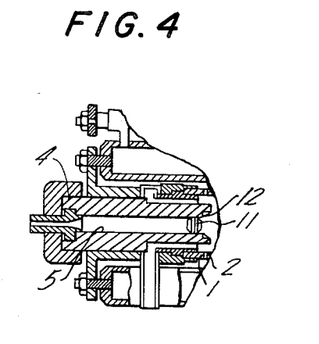
FIG. 4 is a sectional view of a part of the device employing a floating piston placed in the high-pressure chamber.

Channels 10 may not be necessary, if a floating piston 11 used in high-pressure chamber 5 (see FIG. 4). In this case, there should be a guaranteed clearance between the internal wall of cylinder 4 and rod 9 of piston 3, as well as a limiting shoulder 12 serving to preclude dropping of piston 11 out of chamber 5.

Return of piston 11 into the initial position after the impact is provided by the delivery of a liquid of increased pressure compared with the pressure of the liquid supplied into chamber 2 of cylinder 1.

The part of the wall of cylinder 1 which contacts cylinder 4, has one or more openings 13 which serve to deliver liquid under pressure into chamber 2 for forced travel of piston 3. The through section of openings 13 is determined by the velocity of return of the piston 3 to the extreme rear position. Openings 13 also serve for filling of high-pressure chamber 5 with liquid.

The wall of cylinder 1 has, spaced at the side of cylinder 4, openings 14, through which openings the liquid in front of the piston in chamber 2 is discharged during piston acceleration. It is desirable that the total cross section of openings 14 be not less than the internal cross-sectional area of cylinder 1. Openings 14 are periodically closed by a slide 15 in the form of a cylindrical bushing on cylinder 1.

At one side, the travel of slide 15 is limited by a stop 16 located on the external surface of cylinder 1 and, from the other side by packing collar 17, which has a gasket of soft material (for instance, red copper). Pointed nose 18 of slide 15 rests upon said gasket. Such embodiment provides for tight overlapping of openings 14.

At its rear, low-pressure chamber 2 communicates with receivers 19 through openings 20 in the side wall of cylinder 1 and also via annular air collector 21, said collector being rigidly fixed to receivers 19 and being in tight contact with the external surface of cylinder 1. A slight longitudinal movement is possible between the collector and cylinder.

Such connection of cylinder 1 with receivers 19 serves to relieve cylinder 1 of inertia loads of the weight of the receivers 19 at the moment of piston impact upon the liquid. Between cylinder 1 and air collector 21 there is a packing 22. At their fronts, receivers 19 are fixed to a washer 24 by rods 23, said washer being located at the front part of cylinder 4 and precluded by lug 25 from possible movement. Receivers 19 are disposed along a circle in parallel to the axis of cylinder 1. The number of receivers is optional.

The cross section of openings 20 should be maximum; said openings are disposed in a common lateral plane. The distance between openings 20 and face or wall 26 of cylinder 1 is determined by the time of lag of piston 3 in its rear position. Wall 26 is connected with cylinder 1 by cap nut 27. Placed between the face of cylinder 1 and wall 26 is packing 28 which provides for the fluid tightness of chamber 2.

There is a threaded opening 29 in wall 26, with control valve 30 fixed therein and fitted with pin 31 extending into chamber 2 of cylinder 1.

Pin 31 is sealed in its opening by a sleeve 32. Control valve 30 is connected via main lines 33 and 34 with low-pressure chamber 2 and right-hand space 35 of jack 36 respectively (a second jack is not shown). Pistons 37 of jacks 36 are rigidly coupled with slide 15 through rods 38. Left-hand spaces 39 of jacks 36 are coupled with receivers 19 through main line 40.

The rear part of piston 3 is provided with an angular channel 41 in which a non-return valve 42 with axial opening 43 is secured. Valve 42 is designed for the bypass of compressed gas from the space behind the piston in chamber 2 into receivers 19, when piston 3 passes opening 20 while moving in its rear position.

The front part of rod 9 of piston 3 ends in taper-shaped lug 44, which serves as a hydraulic brake to damp the remaining energy of the piston. Piston 3 is fitted with packings 45 intended to preclude leakage of liquid and gas. Rod 9 throughout its length is provided with lateral circular grooves 46 which serve as labyrinth packings for the high-pressure liquid at the time of the impact.

The external surface of rod 9 is coated with an antifriction material. Rod 9 can be integral with piston 3, as shown in FIG. 1, or can be rigidly fixed to the body of the piston.

The proposed device operates according to the following procedure.

At the end of the working stroke, when piston 3 is in the extreme front position (to the left in FIG. 1), receivers 19 and the space of chamber 2 behind the piston are filled with gas compressed up to 50–100 kg./sq. cm.

It should be noted that, in this case, the compressed gas is not consumed in the process of operation, while the losses caused by leakage, due to improper sealing, should be periodically replenished.

Piston 3 separates the front part of chamber 2, as shown in FIG. 1, from discharge openings 14, which are opened at the moment.

Through openings 13, the liquid being pumped under pressure up to 100 kg./sq. cm. (the pump is not shown in the drawing) is delivered into said front part of chamber 2, affects the front face of piston 3 and moves, at the same time, along main line 33 through spaces 47 in the case of valve 30 (which is closed) and main line 34 and is delivered into right-hand space 35 of jacks 36. When the pressure of liquid in said front part of chamber 2 and in spaces 35 of jacks 36 reaches a certain value, slide 15 coupled to jacks 36 closes discharge openings 14, and at this moment piston 3 starts to move to the extreme rear position and chamber 5 is filled with liquid.

With movement of piston 3 compressed gas from chamber 2 is delivered into receivers 19 through openings 20 and air collector 21. When piston 3 overlaps opening 20, compressed gas remaining in the rear part of chamber 2 behind piston 3 is by-passed into receivers 19 through non-return valve 42 and channel 41.

When in its extreme rear position, piston 3 affects pin 31 of valve 30. In this case, valve 30 opens and though the piston separates from pin 31, said valve stays opened until complete discharge of liquid from space 35 of jacks 36. Under the influence of compressed gas, supplied from receivers 19 along main line 40 into space 39 of jacks 36, slide 15 opens discharge openings 14, which is accompanied by drop of pressure in chamber 2 of cylinder 1 in front of piston 3. From this moment on, piston 3 is affected only by the pressure of the compressed gas, delivered from receivers 19 through channel 41 and opening 43 of valve 42, said valve 42 staying closed.

Acceleration of piston 3 begins after openings 20 are no longer closed. The distance between wall 26 and openings 20 is covered by piston 3 at a low speed depending upon the cross-section of opening 43. The value of the cross-section of opening 43 is determined by the time of opening of openings 14 by slide 15 so that the time required for the slide to cover the distance between wall 26 and openings 20 exceeds the time necessary for opening of openings 14.

At the moment of acceleration of piston 3, slide 15 should completely open openings 14, while valve 30 should become closed.

During acceleration, the energy accumulated by compressed gas in the process of compression changes into kinetic energy of piston 3, while the liquid which was in front of the piston in chamber 2, is discharged through openings 14, by the end of acceleration, rod 9 of piston 3 enters chamber 5 through taper-shaped widening 8. After rod 9 passes channels 10, an impact of piston 3 upon the liquid in chamber 5 takes place, which results in a sharp pressure increase. The liquid which receives the energy during the impact is discharged through openings 6. The remaining kinetic energy of piston 3 is damped by hydraulic brake 44.

It should be noted that hydraulic brake 44 may be disposed in the rear part of high-pressure chamber 5. The cross section of chamber 5 may correspond to the cross section of chamber 2, or in other words to the cross section of piston 3.

Described below is another embodiment of the proposed device and its operating principle.

Figure 2:
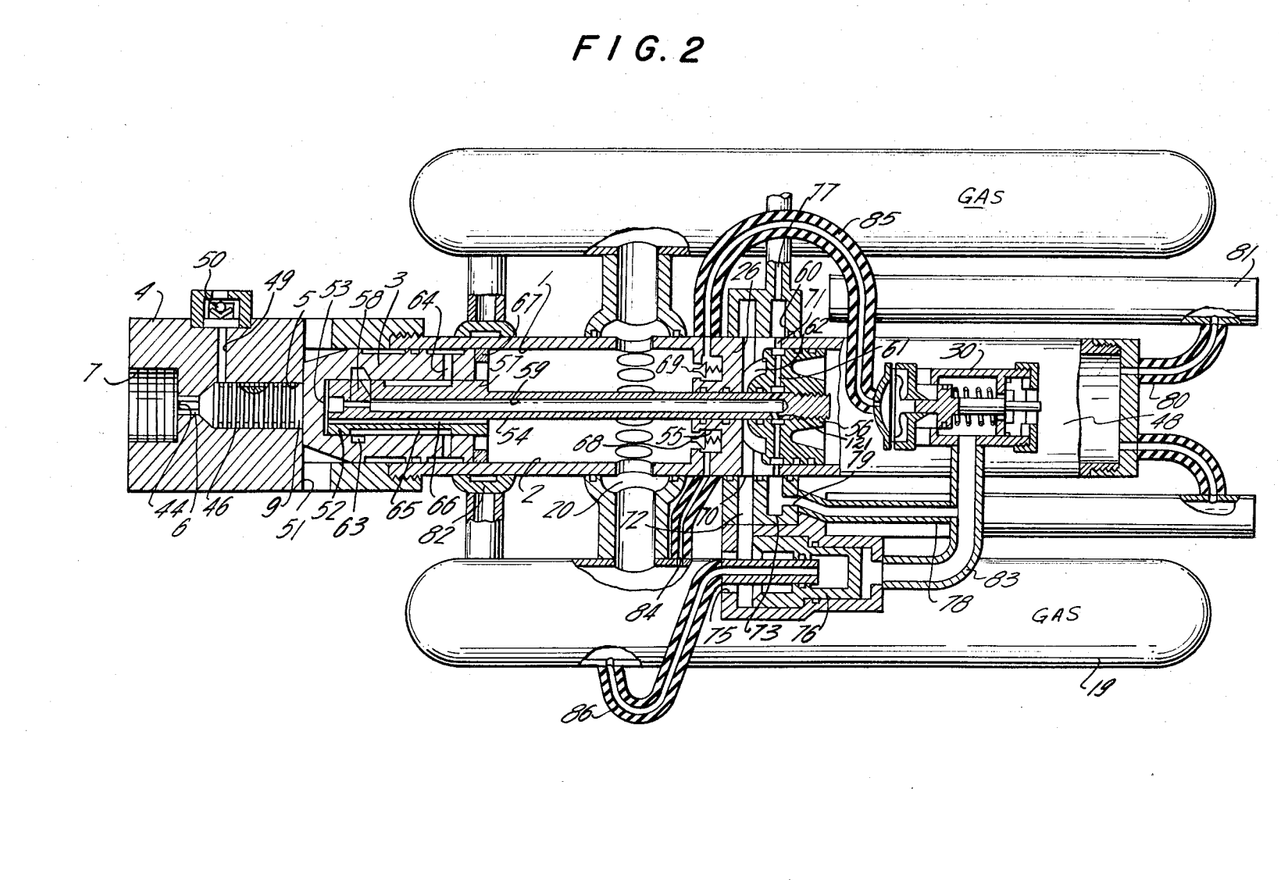
FIG. 2 is a sectional view of a modification of the device in which the forced travel of the piston for compressing gas is effected mechanically.

The device shown in FIG. 2 consists of cylinder 1, to whose rear part power cylinder 48 is attached coaxially.

Fixed rigidly to the front part of cylinder 1 with the help of a threaded connection, is cylinder 4, whose chamber 5 serves as a high-pressure chamber with prestressed walls. The side wall of cylinder 4 is provided with a channel 49, in which non-return valve 50 is located. Channel 49 serves to deliver liquid into chamber 5.

Taper-shaped widening 8 and channels 10, though not shown in the drawing, are in this case obligatory.

The front part of cylinder 4 is provided with thread 7, which serves for the same purpose as in the above mentioned cases, and with opening 6.

Besides, in the side wall of cylinder 4 adjoining high-pressure chamber 5, channels 51 are provided for the discharge of air during the working stroke of the piston. Rod 9 of piston 3 ends in taper-shaped lug 44 and has circular grooves 46.

Piston 3 has space 52 in its rear part, which is entered by catching device 53 fitted with hollow rod 54. Rod 54 of device 53 passes through axial opening 55 in the rear face wall 26 of cylinder 1 and is rigidly fixed to piston 56 of power cylinder 48.

The front part of rod 54 has widening 57. Installed in the body of widening 57 are at least two cams 58, which can move in the radial direction. In its body, rod 54 has channel 59, which communicates through opening 60 and channels 61 in the body of piston 56 with space 62 of power cylinder 48. The internal wall of space 52 in the body of piston 3 is provided with annular slot 63, which is entered by cams 58.

The rear part of piston 3 is provided with channels 64, which communicate with space 52 or circular groove 65 at the external surface of widening 57; circular groove 65 at certain moments communicates with annular slot 63. The body of widening 57 has longitudinal through channel 66 which serves to discharge compressed gas from space 52 of piston 3, when widening 57 enters said space. Centering of catching device 53 in chamber 2 of cylinder 1 is effected with the help of stops 67 with which the body of widening 57 is equipped.

Chamber 2 of cylinder 1 communicates with receivers 19 through openings 20 in the side wall of the cylinder. The cross-section of openings 20 in this case also should be selected so as to be maximum; said openings are to be disposed in a common lateral plane.

Wall 26 of cylinder 1 houses non-return valve 68 used for the discharge of compressed gas into receivers 19 in order to move piston 3 into the rear position, and valve 69 which is opened by piston 3, when the latter is in its extreme rear position.

The purpose of valve 69 is to discharge compressed gas from the space behind the piston into control valve 30 disposed on the external surface of cylinder 1.

Located in the side wall of the front part of power cylinder 48 are channels 70 for the escape of discharged liquid, said liquid being supplied into spaces 62 of power cylinder 48 along channels 71 in order to move piston 56.

Channels 70 and 71 communicate with circular chambers 72 and 73 respectively, said chambers being separated by wall 74. Chamber 72 is opened to the atmosphere through opening 75, which is periodically overlapped by control valve 76. Chamber 73 is connected with the pump not shown in the drawing, through channel 77, and with main line 78 and opening 79 in its side wall is connected to control valve 76 and valve 30.

The rear wall of power cylinder 48 has one or more openings 80, through which openings space 62 constantly communicates with receivers 81 of low-pressure gas. The pressure of gas in receivers 81 should be approximately up to 7–10 kg./sq. cm. The numbers of receivers 81 is optional. It should be noted that the volume of any receivers should be chosen so that with the expansion of gas, the drop of pressure in these receivers does not exceed 20–30 percent. High-pressure receivers in this case are attached to the external side of cylinder 1 with anti-friction bearings 82.

The operating principle of the device as described with reference to the present embodiment is as follows:

Prior to operation, receivers 19 are filled up with compressed gas under a pressure of 50–100 kg./sq. cm., while receivers 81 are filled up with compressed gas with the pressure ranging from 7 to 10 kg./sq. cm. The liquid is supplied into the front part of space 62 of power cylinder 48 through channel 77, circular chamber 73 and channel 71. Further on, through channels 61 in the body of piston 56, openings 60 and channel 59, the liquid is delivered to cams 58 and separates them.

Being separated, the cams enter annular slot 63. At the same moment, the liquid from chamber 73 through opening 79 and main lines 78 and 83 is admitted into control valve 76, which, being shifted, closes opening 75 of circular chamber 72, valve 30 being at this moment closed.

The liquid, supplied into the front part of space 62, affects piston 56 and piston 3 connected with the latter, thus moving piston 56 to the extreme rear position. In this case the low-pressure compressed gas from space 62 behind piston 56 flows into receivers 81, while the compressed gas from chamber 2 behind piston 3 gets into receivers 19 through opening 20 and air collector 21.

When piston 3 closes openings 20 in the side wall of cylinder 1, the compressed gas, which remains between wall 26 and piston 3, flows into receivers 19 through non-return valve 68 and main line 84.

When in the extreme rear position, piston 3 affects valve 69, opening the latter, and discharges the remaining compressed gas which is delivered into valve 30 through main line 85.

Being affected by the compressed gas, valve 30 opens, reducing the liquid pressure in control valve 76, and valve 68 at this moment closes. With piston 3 moving backwards, valve 69 also closes.

After the drop of the liquid pressure in valve 76, the compressed gas which is admitted from receivers 19 through main line 86 to control valve 76, opens the latter, thus reducing the liquid pressure in space 62.

From this moment on, piston 3 and piston 56 can travel only under the action of the compressed gas supplied from receivers 81 into the rear part of space 62.

In this case the leakage of compressed gas from receivers through opening 20 in cylinder 1 into the space formed by the displacement to the left of pistons 3 and 56 (as shown in the drawing) is limited by special packings between piston 3 and wall 26 (not shown in the drawing).

The ratio between the rate of displacement of pistons 3 and 56, on their way from the time they leave wall 26 until openings 20 open, and the above-mentioned leakage should be such that a vacuum is created in the space formed behind piston 3 and cams 58 lose their contact with piston 3.

The air leaves the space in front of piston 3 via channels 51. Coinciding in time with a drop in the liquid pressure in space 62, there occurs a drop in the pressure of liquid in channel 59 of rod 54, said liquid moving into the front part of space 62.

Cams 58 leave annular slot 63 of piston 3, being affected by the compressed gas supplied from receivers 19 through channels 64 and groove 65.

As soon as piston 3 opens openings 20, it becomes disengaged from catching device 53, which continues moving forward at a low speed under the effect of the compressed gas delivered from receivers 81, while piston 3 is accelerated by the compressed gas supplied from receivers 19 through openings 20.

By the moment rod 9 of piston 3 enters chamber 5, the latter should be necessarily filled up with the liquid delivered from the pump through channel 49 and non-return valve 50. The impact of the piston with the liquid results in discharge of said liquid through opening 6.

At the extreme front position of piston 3, lug 44 on rod 9 enters opening 6, thus eliminating the impact of the piston with the walls of chamber 5. Catching device 53 continues moving forward under the effect of the compressed gas supplied from receivers 81. When being in the extreme position, catching device 53 enters space 52 of piston 3, while piston 56 rests upon wall 26 of cylinder 1. Further on the process is repeated.

Figure 3:
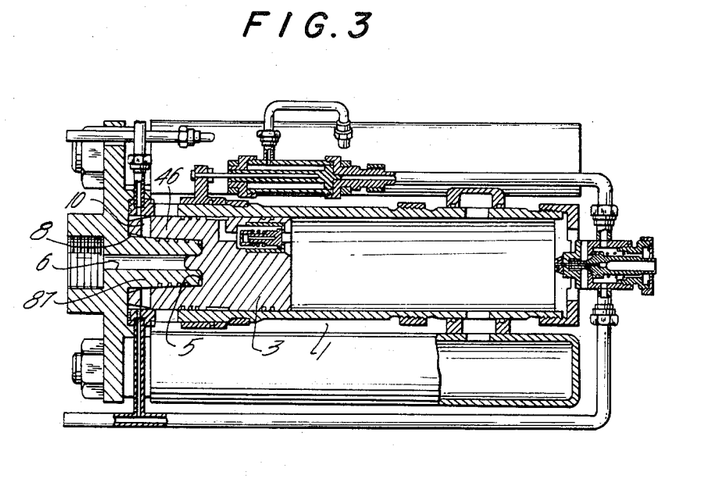
FIG. 3 is a sectional view of a modification of the device in which the high-pressure chamber is mounted in the piston body, the piston being moved by liquid pressure.

The device shown in FIG. 3 differs from the first two embodiments in location of the high-pressure chamber.

High-pressure chamber 5 is made in the body of piston 3; the front face wall of cylinder 1 has internal lug 87 whose cross section corresponds to the cross section of chamber 5. In this case the space of piston 3 serving as a high-pressure chamber is provided with taper-shaped widening 8 and channels 10, said widening and channels being used for the same purpose as in the above-mentioned cases. The external surface of lug 87 has circular grooves 46; axial opening 6 is made in the body of said lug. Besides the differences mentioned, the device in this embodiment does not vary in principle from the devices described above.

Piston 3 is set in the initial position, as shown in FIG. 3, through the use of the liquid pressure, but also with the help of a power mechanism.

In this embodiment, the maximum value of the pressure of discharged liquid is less than in the first two embodiments, and depends upon the strength of the walls of high-pressure chamber 5, the size of these walls being in this case limited by the design. In this case, the device has smaller weight and overall dimensions. Chamber 5 is filled up with liquid automatically with piston 3 being set in the initial position.

Figure 5:
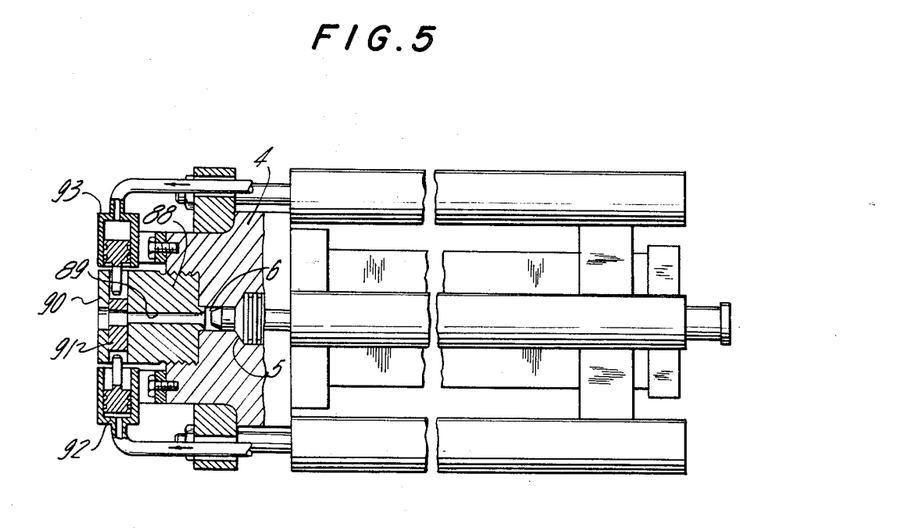
FIG. 5 shows a further embodiment and is a partially sectional view of a device which incorporates a jet head and a mechanism for operating the jet head.
Figure 6:
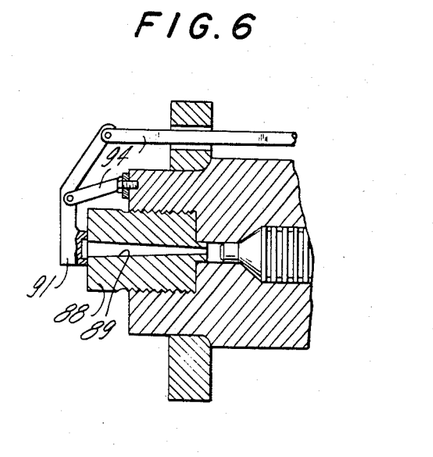
FIG. 6 is a partial sectional view of another device and a mechanism for opening and closing the opening in the jet head in accordance with another embodiment.

Described hereinafter are possible cases of the utilization of the proposed device. FIGS. 5 and 6 illustrate the case when the proposed device is employed for obtaining pulse dynamic sprays. Screwed to the front part of cylinder 4 is jet head 88, which has axial opening 89 coinciding with outlet opening 6 of high-pressure chamber 5.

In case, piston 3 is set in the initial position by the pressure of liquid, it is expedient to equip the device with mechanism 90 serving to periodically open and close opening 89.

Mechanism 90 can be made as slide 91, driven by hydraulic cylinder 92 and pneumatic cylinder 93 (FIGS. 1 and 5), said cylinders being respectively connected through a main line with the right-hand space of jacks 36 and receivers 19 so, that mechanism 90 and slide 15 operate in synchronism. It is quite possible, that slide 91 may be driven by a system of levers 94 coupled with slide 15, as is shown in FIG. 6. In an embodiment employing the catching device (see FIG. 2) opening 89 may not be overlapped. It is desirable to make opening 89 wider at the outlet in order to make the spray free from the remnant acoustic waves and to provide for its long range.

The described device can be used, for instance, to crush rocks of average strength, to clean castings of sand and scorching, to knock out rods in castings, to clean cement furnaces without their stopping, and for other similar purposes. The device can be used to punch holes in lamination material placed on a die.

Figure 7:
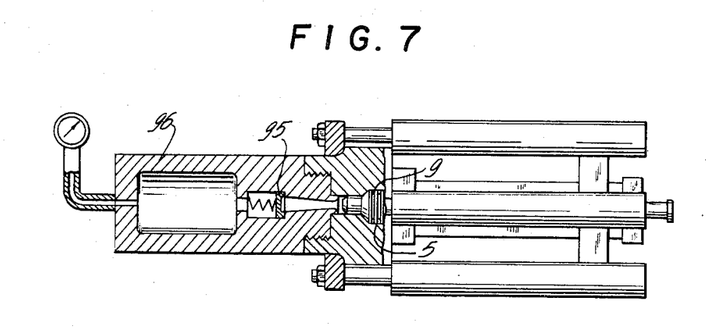
FIG. 7 is a general view of a device of the invention with a connected vessel in section.

As shown in FIG. 7, the device can be used as a high-pressure pump. In this case the sprays are discharged through non-return valve 95, for instance into vessels 96 to be tested for the strength of the walls. The advantage of the device when used as a high-pressure pump is the absence of packings on rod 9 of piston 3. The absence of packings is explained by the high speed of movement of piston 3 in cylinder 1. Circular grooves 46 provide for minimum leakage of liquid through the clearance between rod 9 of piston 3 and the internal wall of high-pressure chamber 5.

Figure 8:
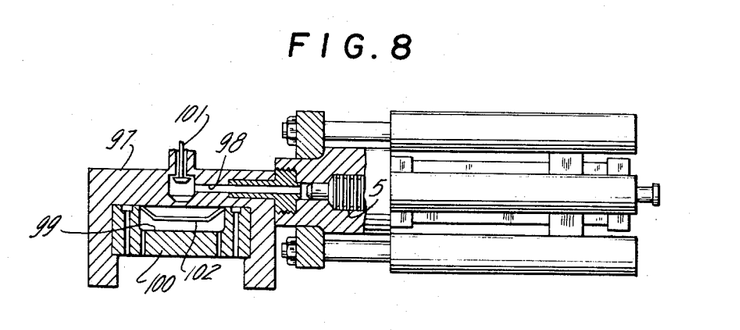
FIG. 8 is a general view of a device of the invention with a closed vessel connected to it, in section, with a die and a blank positioned in said vessel.

One more example of employment of the described device is illustrated in FIG. 8 (hydraulic stamping of parts). Connected to the device is stamp 97 with space 98 communicating with chamber 5 and space 99 of die 100. Spaces 98 and 99 are overlapped by valve 101 during the compression stroke of piston 3, and communicate with each other when piston 3 impacts on the liquid in high-pressure chamber 5. For the purpose of stamping, blank 102 is placed on die 100.

If the volume of the article to be stamped is less than the volume of the liquid discharged during one stroke of piston 3, blank 102 is stamped during one discharge of the spray.

If otherwise, the number of discharges is determined by the volume and strength of the material of the blank to be stamped. The maximum volume of the blank to be stamped is determined by the required pressure and compression ability of the stamping liquid. If a non-return valve is employed (not shown in the drawing) and if leakage from space 98 is eliminated, the volume of this space can be increased unlimitedly.

Figure 9:
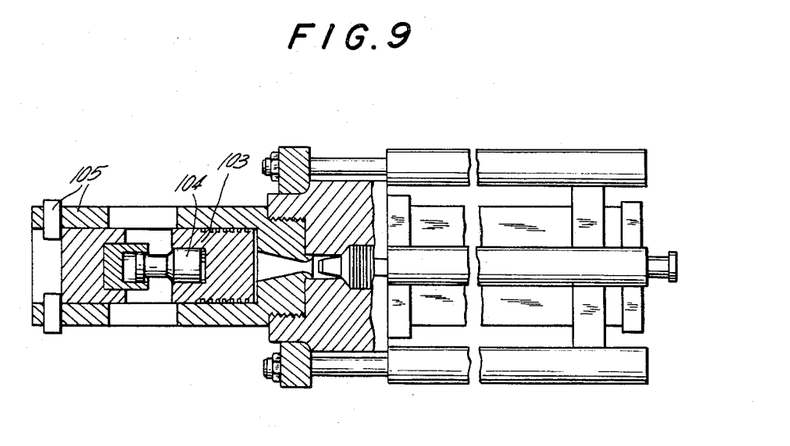
FIGS. 9 and 10 show the device with the connected vessel housing a piston.

FIG. 9 illustrates a special case, when the device is employed as a press. The liquid being discharged from the high-pressure chamber through opening 6 affects piston 103 of the press, thus moving it. Piston 103 carries working member 104. Touching the blank, piston 103 treats the latter. In the above-described case the device may perform cold volume stamping, press welding, embossing, pressing, etc.

As compared with the commonly-used hydraulic presses the speed of piston 103 is much higher, thus providing for the possibility of plastic press deformation of such materials as copper, brass, steel, aluminum. Under the same conditions the press in this embodiment has significantly smaller overall dimensions, than usual hydraulic and mechanical presses. As compared with the mechanical presses, the press in this embodiment can withstand overloading, as the maximum possible load is determined not by the amount of energy received during one working stroke, but by the maximum liquid pressure. Efforts in this case are received by rigid links 105.

Due to the pulse character of the process it is possible to use great efforts developed by the press without imparting them to rigid links.

Figure 10:
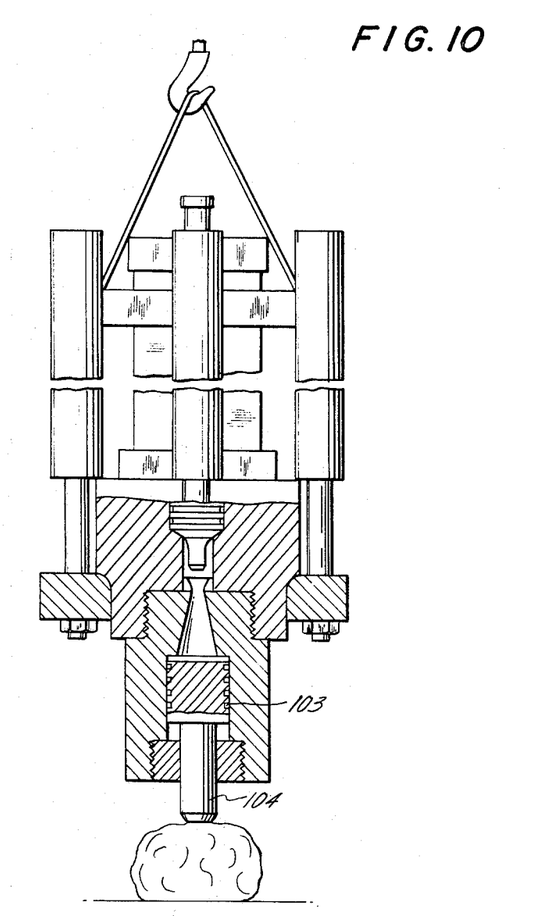

This case is illustrated in FIG. 10 with reference to the embodiment of the device used for crushing rocks. The device employing the same principle can be used for rock excavations.

Figure 11:
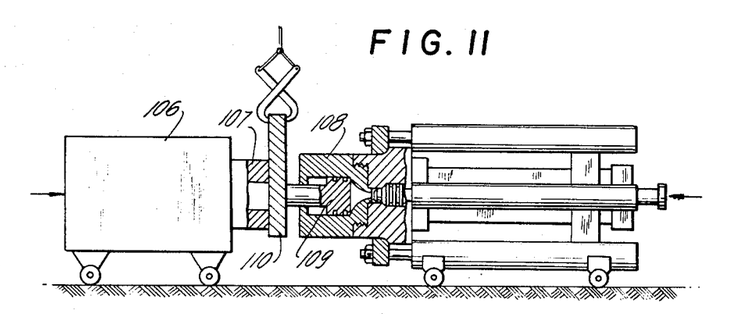
FIG. 11 shows the device being used as a press with the die and the device being movably installed.

It is more expedient to use the described device as a hydraulic press, in which the efforts are imparted to through a movable thrust mass. This case is illustrated in FIG. 11.

Thrust mass 106 with die 107 and a device with connected vessel 108 housing piston 109 are installed so that they can move relatively to each other. Treated workpiece 110 is placed between piston 109 carrying the working member, for instance the punch (conventionally shown in the drawing is the piston only), and movable die 107. Prior to operation, the device and thrust mass 106 are pressed to treated workpiece 110 with the force providing for the return of piston 109 to the initial position. At the moment of the impact of piston 3 upon the liquid, the latter shifts piston 109, which performs useful work and, for instance, punches holes in blank 110. The inertia of thrust mass 106 and of the device in this case serves as a support.

The advantages of this press are: the absence of a solid base as is necessary for a forging hammer, the absence of an operating frame, receiving the forces, such as usually used with hydraulic presses, and independence of the maximum effort value upon the energy liberated during the impact, due to the absorbing action of the liquid.

What is claimed is:

1. A device for building up high pressure pulses of liquid, comprising at least one cylinder and one piston housed in said cylinder; said cylinder having at one side of the piston a first space connected through an opening in the cylinder with at least one receiver filled with compressed gas and serving as a low-pressure chamber; said cylinder having at the other side of the piston a second space in the body of the cylinder face portion, filled up with liquid and provided with at least one outlet opening; said second space having a cross-section corresponding to the cross-section of the piston and serving as a high pressure chamber, said high pressure being built up as a result of the impact of said piston upon the liquid, said piston including in the face portion at the side of the high pressure chamber a taper-shaped lug; circular grooves being provided on the external surface of the piston portion entering the high-pressure chamber; an angular through channel being provided in said piston and connecting its side surface with the face surface at the side of the low pressure chamber; a non-return valve with a through opening being provided in the plunger of said non-return valve located in said angular channel; said cylinder having in the side wall of the high pressure chamber at least one opening for delivering the liquid under pressure for forced travel of said piston in the direction of the low-pressure chamber, openings serving for the discharge of the liquid during the piston working stroke; a cylindrical bushing to open and close said openings and having reciprocating motion along the external surface of said cylinder; jacks secured to the external surface of said cylinder, the rods of said jacks being rigidly connected to the cylindrical bushing with one of the spaces of each jack being connected to a main line delivering the liquid under pressure for travel of the piston, and the other space of each jack communicating with said receiver filled with compressed gas; a command valve including a protruding pin entering the low pressure chamber in the face wall of said sylinder, limiting the low pressure chamber and connecting the hydraulic space of each said jack with the atmosphere with said piston acting upon said protruding pin of said command valve.

2. A device according to claim 1, having a spray head connected to the outlet opening of the high pressure chamber of said device; and a slide valve connected by means of a system of levers and a drive with the rod of one of the jacks of said device and used to periodically open and close the outlet opening in said spray head.

3. A device for building up high pressure pulses of liquid, comprising at least one cylinder and one piston including a rod, housed in said cylinder; said cylinder having at one side of the piston a first space connected through an opening in the cylinder with at least one receiver filled with compressed gas and serving as a low pressure chamber; said cylinder having at the other side of said piston a second space in the body of its face portion and filled with liquid and having at least one outlet opening; said second space having a cross-section corresponding to the cross-section of the rod and serving as a high pressure chamber, said high pressure resulting from impact of the rod of said piston upon the liquid, said high-pressure chamber having at the side of said piston a widening providing for free entry of the rod into the chamber; said cylinder having in its body at the point of the location of said widening channels connecting the high pressure chamber with the space in front of said piston; said rod including a taper-shaped lug, circular grooves being provided on the rod in that portion entering the high-pressure chamber; an angular through channel being provided in said piston, connecting the side surface thereof with the surface facing the low-pressure chamber; a non-return valve including a plunger and having a through opening in the plunger, said non-return valve being located in said angular channel to permit flow from the low-pressure chamber; said cylinder being provided adjacent the high-pressure chamber with at least one opening for delivering liquid under pressure for forced travel of said piston in the direction of the low pressure chamber; openings being provided in the cylinder for the discharge of the liquid during the working stroke of the piston; a cylindrical bushing for closing and opening said openings and adapted for reciprocating motion along the external surface of said cylinder; jacks secured to the external surface of said cylinder and including rods rigidly connected to said cylindrical bushing, with one of the spaces of each jack being connected to a main line delivering liquid under pressure for travel of the piston, and the other space being connected to said receiver filled with compressed gas; a command valve on said cylinder including a protruding pin entering the low-pressure chamber for limiting the low-pressure chamber and connecting the hydraulic space of each said jack with the atmosphere, with said piston acting upon said protruding pin of said command valve.

4. A device for building up high pressure pulses of liquid, comprising at least one cylinder and one piston housed in said cylinder; said cylinder having at one side of the piston a space connected through an opening in the cylinder with at least one receiver filled with compressed gas and serving as a low pressure chamber; said cylinder including an internal lug at the other side of said piston; said piston having at the side of said lug a space filled with liquid and serving as a high pressure chamber, said high pressure being built up as a result of the impact of the piston upon the liquid, said lug of said cylinder entering the space of said piston, said space having a cross-section corresponding to the cross-section of said lug; said lug having on the portion entering the high pressure chamber circular grooves; said space in said piston having a widening providing for free entry of said lug into the latter said space; said piston having adjacent said widening, channels connecting the high pressure chamber with the space in said piston, a taper-shaped lug in said high pressure chamber; an angular through channel provided in said piston and connecting its side surface with the surface facing the low-pressure chamber; a non-return valve including a plunger and provided with a through opening in the plunger, said non-return valve being located in said angular channel; said cylinder including a side wall adjacent the high-pressure chamber provided with at least one opening for delivering liquid under pressure for forced travel of said piston in the direction of the low pressure chamber, said cylinder being provided with openings for the discharge of liquid during the piston working stroke; a cylindrical bushing to close and open said openings and adapted for reciprocating motion along said cylinder; jacks secured to said cylinder and including rods rigidly connected to said cylindrical bushing, with one of the spaces of each jack being connected to a main line delivering liquid under pressure for effecting travel of the piston, and the other communicating with said receiver filled with compressed gas; a command valve on said cylinder including a protruding pin entering the low pressure chamber for limiting the low pressure chamber and connecting the hydraulic space of each said jack with the atmosphere with the said piston acting upon the protruding pin of said command valve.

5. A device for building up high pressure pulses of liquid, comprising at least one cylinder and one piston housed in said cylinder; said cylinder having at one side of the piston a first space connected through openings with a plurality of receivers located around said cylinder and filled with compressed gas and serving as a low pressure chamber; said cylinder having at the other side of the piston a second space filled with liquid and provided with at least one outlet opening; said second space having a cross-section corresponding to the cross-section of the piston and serving as a high pressure chamber, said high pressure being built up as a result of the impact of said piston upon the liquid, said piston including at the side of the high pressure chamber a taper-shaped lug; circular grooves provided on the piston portion entering the high pressure chamber; an angular through channel being provided in said piston and connecting its side surface with the surface facing the low-pressure chamber; a non-return valve including a plunger with a through opening, said non-return valve located in said angular channel and permitting flow from the low-pressure chamber; said cylinder having adjacent the high-pressure chamber at least one opening for delivering liquid under pressure for the forced travel of said piston in the direction of the low pressure chamber, openings being provided in the cylinder for the discharge of liquid during the piston working stroke; a cylindrical bushing for closing and opening said openings and adapted for reciprocating motion along the external surface of said cylinder; jacks on said cylinder and including rods rigidly connected to said cylindrical bushing, one of the spaces of each jack being connected to a main line delivering liquid under pressure for effecting travel of the piston, and the other space of each jack communicating with at least one said receivers filled with compressed gas; a command valve on said cylinder and including a protruding pin entering the low pressure chamber for limiting the low pressure chamber and connecting the hydraulic space of each said jack with the atmosphere, with said piston acting upon said protruding pin of said command valve.

6. A device for building up high pressure pulses of liquid, comprising at least one cylinder and one piston including a rod, housed in said cylinder; said cylinder having at one side of the piston a first space connected through openings with a receiver located around said cylinder and filled with compressed gas and serving as a low pressure chamber; said cylinder having at the other side of the piston a second space filled with liquid and having at least one outlet opening; said second space having a cross-section corresponding to the cross-section of the rod and serving as a high-pressure chamber, said high pressure being built up as a result of the impact of said piston rod upon the liquid, said high pressure chamber having a widening providing for free entry of the rod into said chamber; said cylinder having, adjacent said widening, channels connecting the high pressure chamber with the space in front of said piston; said rod including adjacent the high pressure chamber a taper-shaped lug, circular grooves being provided on the rod portion entering the high pressure chamber, an angular through channel being provided in said piston and connecting its side surface with the surface facing the low pressure chamber; a non-return valve including a plunger provided with a through opening, said non-return valve being located in said angular channel and permitting flow from the low-pressure chamber; said cylinder having at the side of the high-pressure chamber at least one opening for delivering the liquid under pressure for effecting forced travel of the piston in the direction of the low-pressure chamber, said cylinder being provided with openings for the discharge of the liquid during the piston working stroke; a cylindrical bushing for closing and opening said openings and adapted for reciprocating motion along the external surface of said cylinder; jacks on said cylinder and including rods rigidly connected to said cylindrical bushing with one of the spaces of each jack being connected to a main line delivering the liquid under pressure for travel of the piston, and the other space of each jack communicating with at least one of said receivers filled with compressed gas; a command valve on said cylinder and including a projecting pin entering the low pressure chamber limiting the low pressure chamber and connecting the hydraulic space of each said jack with the atmosphere, with said piston acting upon said protruding pin of said command valve.

7. A device according to claim 6, having a spray head connected to the outlet opening of the high pressure chamber, a slide valve used to periodically close and open the outlet opening in said spray head, a hydraulic cylinder and a pneumatic cylinder located at both sides of said valve and used to drive the latter, said hydraulic cylinder being connected in turn with the main line supplying liquid under pressure and the atmosphere, whereas the pneumatic cylinder is connected at least with one receiver filled up with compressed gas.

8. A device according to claim 6 having a floating piston housed in said high pressure chamber and having the cross-section corresponding to the cross-section of the high pressure chamber; said floating piston having circular grooves provided on the external surface thereof.

9. A device according to claim 6 having a closed vessel connected to the outlet opening of the high pressure chamber of said device.

10. A device according to claim 6 having a closed vessel connected to the outlet opening of the high pressure chamber of said device through a non-return valve.

11. A device according to claim 6, comprising a die with a blank, placed into said closed vessel in order to stamp a part.

12. A device according to claim 6 having a vessel connected to the outlet opening of the high pressure chamber of said device, a piston housed in said vessel to perform its working stroke under the action of the pressure of the discharged liquid spray, and a working member rigidly connected to said piston housed in said vessel.

13. A device according to claim 6 having a vessel connected to the outlet opening of the high pressure chamber of said device, a piston housed in said vessel and performing its working stroke under the action of the pressure of the discharged liquid spray, a working member made as a punch and rigidly connected to said piston housed in said vessel, and a die mounted on a stationary support to permit treatment of parts by means of said punch.

14. A device according to claim 6 having a vessel connected to the outlet opening of the high pressure chamber of said device, a piston housed in said vessel and performing its working stroke under the action of the pressure of the discharged liquid spray, a working member made as a punch and rigidly connected to said piston housed in said vessel, and a die mounted on a movable support to permit treatment of parts by means of said punch.

15. A device for building up high pulse pressures of liquid comprising
   a first cylinder (1) (see FIG. 2);
   a first piston (3) provided with a space (52) and a rod (9), housed in said first cylinder (1) and dividing the same into two spaces (111) and (2);
   said rod being provided with circular grooves (46) in the outer surface thereof;
   said rod further including an end portion;
   a taper-shaped lug (44) on the end portion of said rod (9);
   at least one receiver (19), with compressed gas therein, connected through openings (20) provided in said first cylinder (1) to one of said two spaces (2), and forming together with the latter a low-pressure chamber;
   a high-pressure cylinder (4) coaxially connected to said space (111) and including a front provided with an internal thread (7) adapted for being connected to an energy consumer;
   said first cylinder including a face wall (26);
   a power cylinder (48) coaxially connected to the face wall (26) of said first cylinder (1);
   a compressed gas source (81);
   a second piston (56) housed in said power cylinder (48) and dividing the same into a space (62) and a space (118), the latter being coupled with a compressed gas source (81), the pressure in which is lower than that in said receiver (19);
   said power cylinder (48) being provided with channels (70) for draining liquid into the atmosphere when the working stroke of said second piston (56) is completed;
   said second piston (56) including a hollow rod (54) provided with a channel (59) passing through said face wall (26) of said first cylinder (1) into said space (2) of said first cylinder (1);
   a source of liquid pressure;
   said second piston (56) being provided with channels (121) to supply liquid, when said piston (56) is in its extreme front position, to the channel (59) of said hollow rod (54) from said source of liquid pressure;

cams (58) adapted to engage said first piston (3);

said power cylinder (48) being provided with channels (71) for supplying liquid into the channel (59) of said hollow rod (54) and one of said spaces (62) of said second piston (56) to provide for an engagement of said cams (58) with said first piston (3) and the reversal stroke of said second piston (56);

said cams (58) being located at the end portion of said hollow rod (54) for engaging said first piston (3) of said first cylinder (1) under the action of the pressurized liquid supplied via the channel (59) of said hollow rod (54), and releasing said first piston (3) from the effect of the compressed gas pressure, supplied through channels (64), circular groove (65) and annular slot (63) provided in said first piston (3);

a first non-return valve (68) fixed in said face wall (26), and connecting said one space (2) of said first cylinder (1) to the compressed gas receiver (19) after the openings (20) of said first cylinder (1) are closed by said first piston (3) during the reversal stroke thereof;

a control valve (30) including a membrane (119);

a second non-return valve (69) fixed in said face wall (26) of said first cylinder (1), and connecting one said space (2) of said first cylinder (1) to the control valve (30), when said first piston (3) acts upon said valve (30) at the end of its reversal stroke;

a second control valve (76);

said control valve (30) being connected through openings (79) to said source of liquid pressure, said second non-return valve (69), said second control valve (76) and the atmosphere, and opened by the compressed gas acting upon said membrane (119) of the command valve (30) when said first piston (3) operates said second non-return valve (69);

said second control valve (76) being constantly connected to said compressed gas receiver (19), the first said control valve (30), one of said spaces (62) of said power cylinder (48), and connected to the atmosphere at the end of the working stroke of said second piston (56);

and a high-pressure chamber (5) in said high-pressure cylinder (4), provided with a channel (49) for supplying liquid therein, the cross-section of said chamber corresponding to the cross-section of said rod (9) of said first piston (3);

there being provided at least one outlet opening (6) in said high-pressure chamber (5), for draining from the device liquid under a high pressure built up as a result of an impact received from said first piston (3) accelerated to high speed by the compressed gas in the low-pressure chamber.

References Cited
UNITED STATES PATENTS

| | | | |
|---|---|---|---|
| 1,389,300 | 8/1921 | Gasche | 60—54.5 X |
| 2,357,632 | 9/1944 | Cornelius | 60—54.5 |
| 2,787,123 | 4/1957 | Delvaux | 60—57 |
| 2,827,764 | 3/1958 | Simmonds | 60—51 |
| 3,191,383 | 6/1965 | Basset | 60—54.5 |
| 2,032,185 | 2/1936 | Sciaky. | |
| 2,540,347 | 2/1951 | Pounds | 60—57 |

FOREIGN PATENTS 729,941  5/1955  Great Britain.

MARTIN P. SCHWADRON, *Primary Examiner.*

ROBERT R. BUNEVICH, *Assistant Examiner.*